US012240006B2

(12) United States Patent
Liang et al.

(10) Patent No.: US 12,240,006 B2
(45) Date of Patent: Mar. 4, 2025

(54) ALL-PLASTIC PUMP

(71) Applicant: Guangzhou Shanggong Plastic Co., Ltd, Guangzhou (CN)

(72) Inventors: Qiquan Liang, Guangzhou (CN); Yun Huang, Guangzhou (CN); Haoyu Liang, Guangzhou (CN)

(73) Assignee: Guangzhou Shanggong Plastic Co., Ltd, Guangzhou (CN)

( * ) Notice: Subject to any disclaimer, the term of this patent is extended or adjusted under 35 U.S.C. 154(b) by 0 days.

(21) Appl. No.: 17/416,534

(22) PCT Filed: Sep. 8, 2020

(86) PCT No.: PCT/CN2020/113997
§ 371 (c)(1),
(2) Date: Jun. 21, 2021

(87) PCT Pub. No.: WO2022/036772
PCT Pub. Date: Feb. 24, 2022

(65) Prior Publication Data

US 2024/0253073 A1 Aug. 1, 2024

(30) Foreign Application Priority Data

Aug. 18, 2020 (CN) ......................... 202010830557.3

(51) Int. Cl.
*B05B 11/10* (2023.01)

(52) U.S. Cl.
CPC ...... *B05B 11/1028* (2023.01); *B05B 11/1067* (2023.01); *B05B 11/1077* (2023.01)

(58) Field of Classification Search
CPC ............. B05B 11/1028; B05B 11/1067; B05B 11/1077; B05B 11/1069; B05B 11/1001;
(Continued)

(56) References Cited

U.S. PATENT DOCUMENTS 4,079,865 A * 3/1978 Kutik .................. B05B 11/1015 222/321.9
7,735,693 B2 * 6/2010 Pares .................. B05B 11/1077 222/321.2

(Continued)

FOREIGN PATENT DOCUMENTS

CN 102464133 A 5/2012
CN 204896181 U * 12/2015

(Continued)

*Primary Examiner* — Dominick L Plakkoottam
(74) *Attorney, Agent, or Firm* — Hawaii Patent Services; Nathaniel K Fedde; Kenton N. Fedde

(57) ABSTRACT

An all-plastic pump comprising an outer cover, a plastic spring, an inner cover and a pressing head. The pump includes an accessory cavity in the outer cover, with a conveying hole. A tubular plastic spring is positioned within the cavity, surrounding the conveying hole. Supporting rods are arranged circumferentially on an inner wall of the plastic spring's port, with one end of the rods connected to a baffle. The inner cover surrounds the plastic spring, and a stop tube is inserted through the supporting rods, with its port sealing against the baffle. The pressing head, mounted in a pressable manner, includes a discharging hole, pressing sheet, and conveying tube. When pressed, the pressing sheet compresses the plastic spring, causing separation between the baffle and stop tube, allowing fluid discharge.

10 Claims, 11 Drawing Sheets

(58) Field of Classification Search
CPC ............. B05B 11/1043; B05B 11/1073; B05B 11/1038
See application file for complete search history.

(56) References Cited

U.S. PATENT DOCUMENTS

| | | | | | |
|---|---|---|---|---|---|
| 10,335,816 | B1 * | 7/2019 | Arminak | ............. | B05B 11/1059 |
| 10,753,485 | B2 * | 8/2020 | Kang | .................. | B05B 11/1069 |
| 11,772,114 | B2 * | 10/2023 | Zhu | ..................... | B05B 11/0075<br>222/320 |
| 2019/0203792 | A1 * | 7/2019 | Deman | ..................... | F16F 1/44 |
| 2019/0366376 | A1 * | 12/2019 | Rossignol | ........... | B29C 45/0055 |
| 2019/0368567 | A1 * | 12/2019 | Deman | ................... | F16F 1/373 |

FOREIGN PATENT DOCUMENTS

| | | | | | |
|---|---|---|---|---|---|
| CN | 107264970 | A | * | 10/2017 | ......... B05B 11/3023 |
| CN | 106428966 | A | | 3/2018 | |
| CN | 109878886 | A | | 6/2019 | |
| CN | 110116865 | A | * | 8/2019 | ......... B05B 11/3039 |
| CN | 110723408 | A | | 1/2020 | |
| CN | 210213344 | U | | 3/2020 | |
| CN | 111038842 | A | * | 4/2020 | |
| CN | 212314343 | U | | 1/2021 | |
| EP | 0560060 | A1 | * | 9/1993 | |
| JP | 1059403 | A | | 3/1998 | |
| WO | WO-2019238237 | A1 | * | 12/2019 | |

* cited by examiner

ALL-PLASTIC PUMP

TECHNICAL FIELD

The disclosure relates to the field of pump heads, in particular to an all-plastic pump.

BACKGROUND ART

In daily life, paste materials are usually stored by a hose. The hose includes a pump head and a bottle body made of plastic. Although the pump body is also basically made of plastic, due to the fact that a spring in the pump head is made of metal, the pump head and the bottle body need to be respectively recycled when recycled, and cannot be treated together, which causes great trouble in recycling of the hose, and therefore a technical means capable of solving the problem is urgently needed.

SUMMARY OF THE INVENTION

The objective of the disclosure is to provide an all-plastic pump to solve the problem that an existing pump head is inconvenient to directly recycle.

In order to solve the above technical problem, the disclosure provides an all-plastic pump including an outer cover, a plastic spring, an inner cover and a pressing head. An accessory cavity is defined by the outer cover, and a conveying hole is formed inside the accessory cavity. The plastic spring is disposed in the accessory cavity, and the plastic spring is in a tubular shape. The plastic spring surrounds the conveying hole. A plurality of supporting rods are circumferentially disposed on an inner wall of a port, away from the conveying hole, of the plastic spring, and respective ends of supporting rods, close to the conveying hole, of the plurality of supporting rods are connected to a baffle. The inner cover is disposed in the accessory cavity, and the inner cover surrounds the plastic spring. A stop tube is disposed inside the inner cover, the stop tube penetrates into a space defined by the plurality of supporting rods, and a port of the stop tube is in sealing abutting connection with the baffle. The pressing head is installed in the accessory cavity in a pressable manner, and a discharging hole is formed outside the pressing head. A pressing sheet and a conveying tube are disposed inside the pressing head. The pressing sheet surrounds the conveying tube, and the pressing sheet is opposite to an end face of the plastic spring. The conveying tube is inserted into the stop tube, and the conveying tube is in communication with the discharging hole. Pressing of the pressing head is configured to push the pressing sheet to urge the plastic spring so as to separate the baffle and the stop tube from each other.

In one embodiment, a length of the plurality of supporting rods is smaller than a length of the plastic spring so that the baffle can move inside the plastic spring through compression of the plastic spring.

In one embodiment, a portion, opposite to the pressing sheet, of the inner cover is provided with a hollow groove. A portion, opposite to the hollow groove, of an end face of the plastic spring is provided with a pressing groove, and the pressing sheet penetrates through the hollow groove and is embedded into the pressing groove.

In one embodiment, the plastic spring includes a narrow tube section and a wide tube section connected to each other. The baffle and the plurality of supporting rods are disposed in the narrow tube section, and the wide tube section surrounds the conveying hole.

In one embodiment, a plurality of circles of convex rings separately arranged are disposed on an outer surface of the narrow tube section, and circumferentially surrounds an outer wall of the narrow tube section.

In one embodiment, the plastic spring further includes a buffer tube section, a tube diameter of the buffer tube section is larger than a tube diameter of the narrow tube section, and is smaller than a tube diameter of the wide tube section.

In one embodiment, a joint of the buffer tube section and the wide tube section is provided with a plurality of reinforcing ribs, and both the buffer tube section and the wide tube section are connected to the reinforcing ribs.

In one embodiment, a circle of guide wall is disposed on the inner wall of the port, away from the conveying hole, of the plastic spring, and the guide wall surrounds the stop tube and is connected and fixed to the plurality of supporting rods.

In one embodiment, a check cavity is disposed in a side, facing away from the accessory cavity, of the outer cover. A check valve is disposed in the check cavity, and the check cavity and the accessory cavity are in communication through the conveying hole. The check valve is configured to achieve one-way communication in the direction from the check cavity to the accessory cavity.

In one embodiment, a guide hole is formed inside the check cavity. The check valve includes a guide column and an arc-cover-shaped sealing cover connected to each other. The guide column is inserted into the guide hole, and a gap is reserved between the guide column and a hole wall of the guide hole. The sealing cover blocks communication between the conveying hole and the guide hole. The sealing cover can deform under the action of external force, so that the conveying hole is in communication with the guide hole.

The disclosure has the following beneficial effects:

Due to the fact that the pressing action of the pressing head is configured to push the pressing sheet to urge the plastic spring to separate the baffle and the stop tube from each other, a pump head can still be opened and closed after the plastic spring is adopted. Therefore, a metal spring is replaced with the plastic spring, and the problem that an existing pump head is inconvenient to directly recycle is practically solved.

BRIEF DESCRIPTION OF THE DRAWINGS

To describe the technical solutions of the disclosure more clearly, the following briefly describes accompanying drawings required for describing the embodiments. Apparently, the following described accompanying drawings are only some of the embodiments of the disclosure, and those of ordinary skill in the art may still derive other drawings from these accompanying drawings without creative efforts.

Figure 1:
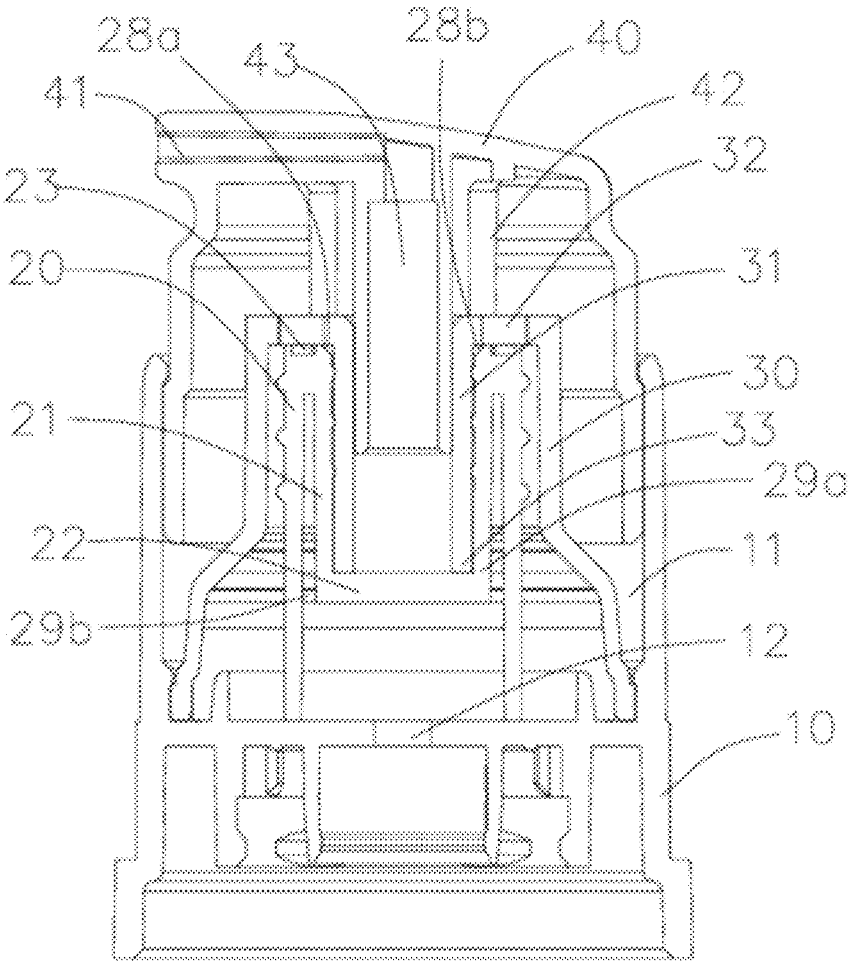
FIG. 1 is a schematic structural sectional view provided by a first embodiment of the disclosure.

Reference numerals are as follows: 10: outer cover; 11: accessory cavity; 12: conveying hole; 13: check cavity; 14: guide hole; 15: hole wall of guide hole; 20: plastic spring; 21: supporting rod; 22: baffle; 23: pressing groove; 241: narrow tube section; 242: wide tube section; 243: buffer tube section; 25: convex ring; 26: reinforcing rib; 27: guide wall; 28*a*: inner wall; 28*b*: port; 29*a*: respective ends of supporting rods; 29*b*: end face of plastic spring; 30: inner cover; 31: stop tube; 32: hollow groove; 33: port of stop tube; 40: pressing head; 41: discharging hole; 42: pressing sheet; 43: conveying pipe; 50: plastic bottle body; 60: check valve; 61: guide column; 62: sealing cover.

DETAILED DESCRIPTION OF THE INVENTION

The following clearly and completely describes the technical solutions in the implementations of the disclosure with reference to the accompanying drawings in the implementations of the disclosure.

A first embodiment of an all-plastic pump is shown in FIGS. 1-4, and includes an outer cover 10, a plastic spring 20, an inner cover 30 and a pressing head 40. An accessory cavity 11 is defined by the outer cover 10, and a conveying hole 12 is formed inside the accessory cavity 11. The plastic spring 20 is disposed in the accessory cavity 11, and the plastic spring 20 is in a tubular shape. The plastic spring 20 surrounds the conveying hole 12. A plurality of supporting rods 21 are circumferentially disposed on an inner wall 28*b* of a port 28*a*, away from the conveying hole 12, of the plastic spring 20, and respective ends 29*a* of supporting rods 21, close to the conveying hole 12, of the plurality of supporting rods 21 are connected to a baffle 22. The inner cover 30 is disposed in the accessory cavity 11, and the inner cover 30 surrounds the plastic spring 20. A stop tube 31 is disposed inside the inner cover 30, the stop tube 31 penetrates into a space defined by the plurality of supporting rods 21, and a port 33 of the stop tube 31 is in sealing abutting connection with the baffle 22. The pressing head 40 is installed in the accessory cavity 11 in a pressable manner, and a discharging hole 41 is formed outside the pressing head 40. A pressing sheet 42 and a conveying tube 43 are disposed inside the pressing head 40. The pressing sheet 42 surrounds the conveying tube 43, and the pressing sheet 42 is opposite to an end face 29*b* of the plastic spring 20. The conveying tube 43 is inserted into the stop tube 31, and the conveying tube 43 is in connection and communication with the discharging hole 41. Pressing of the pressing head 40 is configured to push the pressing sheet 42 to urge the plastic spring 20 so as to separate the baffle 22 and the stop tube 31 from each other.

In the application, a lower end of the outer cover 10 is configured to be connected and fixed to a plastic bottle body 50. For example, the two may be in threaded connection, and after the two are fixed, the all-plastic pump can extract contents from the plastic bottle body 50 through the conveying hole 12 for discharge.

When the pressing head 40 is not pressed, the plastic spring 20 is in a stretching state, and a lower port 33 of the stop tube 31 and the baffle 22 are attached to each other, so that the contents are prevented from flowing out, and a check effect is realized. When the pressing head 40 is pressed, the pressing sheet 42 applies a downward pushing force to an end face 29*b* of the plastic spring 20, the plastic spring 20 is in a contracted state, so that the baffle 22 moves downwards, the baffle 22 and the stop tube 31 are separated from each other, and the contents can flow into the stop tube 31 through a space formed after separation of the baffle 22 and the stop tube 31, thereby flowing through the conveying pipe 43 and the discharging hole 41 to be output.

In summary, according to the embodiment, after a metal spring is replaced with the plastic spring 20, a pump head can still be opened and closed, meanwhile, a high-efficiency check effect is realized, and the problem that an existing pump head is inconvenient to directly recycle is practically solved.

In order to separate the baffle 22 from the stop tube 31, it should be ensured that the baffle 22 has an enough moving space, for example, an enough space may be disposed on the outer cover 10 for the baffle 22 to move. But in order to improve the structural compactness of a product, as shown in FIG. 1, in this embodiment, a length of the plurality of support rods 21 is set to be smaller than a length of the plastic spring 20 so as to move the baffle 22 inside the plastic spring 20 through compression of the plastic spring 20, so that at the moment, a moving space for the baffle 22 is reserved inside the plastic spring 20, space occupation in the outer cover 10 is avoided, and the structure of the product can be reduced.

Figure 2:
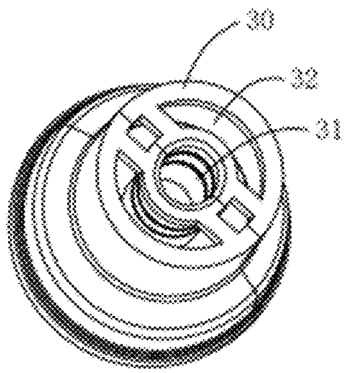
FIG. 2 is a schematic structural diagram of an inner cover in FIG. 1.
Figure 3:
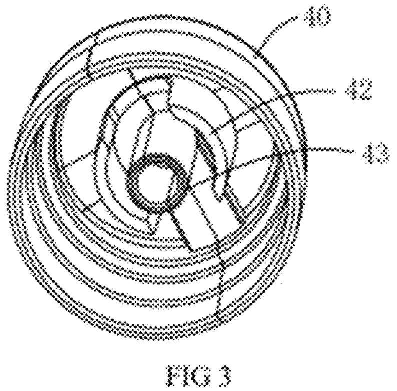
FIG. 3 is a schematic structural diagram of a pressing head in FIG. 1.
Figure 4:
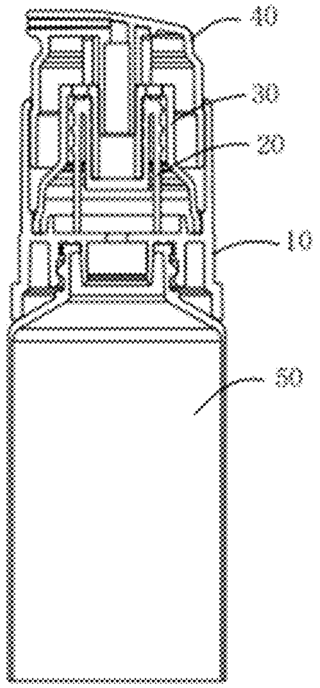
FIG. 4 is a schematic structural sectional view of assembly of FIG. 1 and a plastic bottle body.

In addition, in order to ensure that the pressing sheet 42 can accurately press the plastic spring 20, as shown in FIGS. 1-3, in this embodiment, a portion, opposite to the pressing sheet 42, of the inner cover 30 is provided with a hollow groove 32. A portion, opposite to the hollow groove 32, of an end face 29*b* of the plastic spring 20 is provided with a pressing groove 23, and the pressing sheet 42 penetrates through the hollow groove 32 and is embedded into the pressing groove 23.

Figure 5:
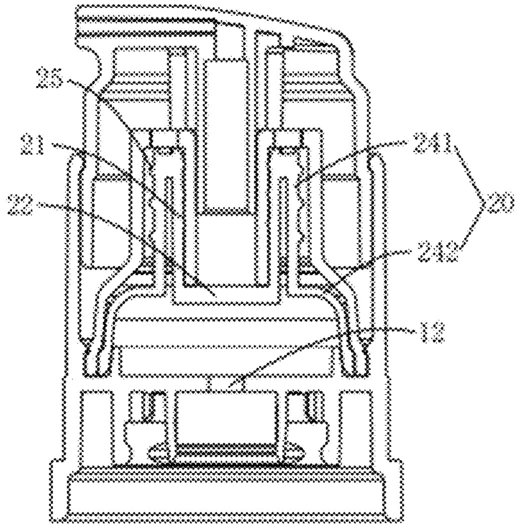
FIG. 5 is a schematic structural sectional view provided by a second embodiment of an all-plastic pump of the disclosure.

For example, the number of the pressing sheets 42 in this embodiment is two, and the pressing sheet 42 is in an arc shape, the hollow groove 32 and the pressing groove 23 are also in an arc shape. After the pressing sheet 42 penetrates through the hollow groove 32 and is inserted into the pressing groove 23, accurate alignment of the pressing sheet 42 and the plastic spring 20 will be realized, and it is ensured that the pressing sheet 42 can directly press the plastic spring 20. A second embodiment of an all-plastic pump is shown in FIG. 5, which is basically the same as the first embodiment of the all-plastic pump. The difference is that the plastic spring 20 includes a narrow tube section 241 and a wide tube section 242 connected to each other, a baffle 22 and a plurality of supporting rods 21 are disposed in the narrow tube section 241, and the wide tube section 242 surrounds a conveying hole 12.

After the disposing way is adopted, as a tube diameter of the narrow tube section 241 is small, elastic deformation resilience is high, so that the deformation resilience of the plastic spring 20 is ensured. While a tube diameter of the wide tube section 242 is large, it is ensured that contents have an enough storage space, providing an important guarantee for smooth extraction of the contents.

Moreover, in order to realize a deformation recovery function of the narrow tube section 241, in this embodiment, a plurality of circles of convex rings 25 separately arranged are disposed on an outer surface of the narrow tube section 241, and circumferentially surrounds an outer wall of the narrow tube section 241. Due to the fact that a thickness of a corresponding position of the narrow tube section 241 is increased by the convex ring 25, a deformation area of the narrow tube section 241 is limited between adjacent convex rings 25. Therefore, the narrow tube section 241 has a telescopic function as a spring.

Figure 6:
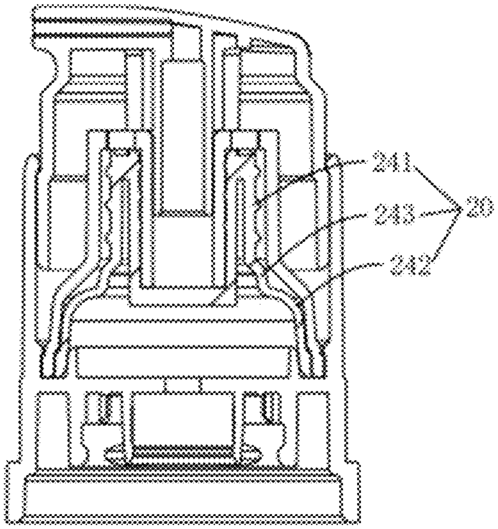
FIG. 6 is a schematic structural sectional view provided by a third embodiment of an all-plastic pump of the disclosure.

A third embodiment of an all-plastic pump is shown in FIG. 6, which is basically the same as the second embodiment of the all-plastic pump. The difference is that the plastic spring 20 further includes a buffer tube section 243, and a tube diameter of the buffer tube section 243 is larger than a tube diameter of the narrow tube section 241, and is smaller than a tube diameter of the wide tube section 242.

At the moment, a big-end-down cover-shaped structure is defined by the buffer tube section 243, so that direct transition between the narrow tube section 241 and the wide tube section 242 is avoided, contraction performance of the narrow tube section 241 is linearly changed, stretching and contraction smoothness of the plastic spring 20 is improved, and a better user experience is provided for a user.

Figure 7:
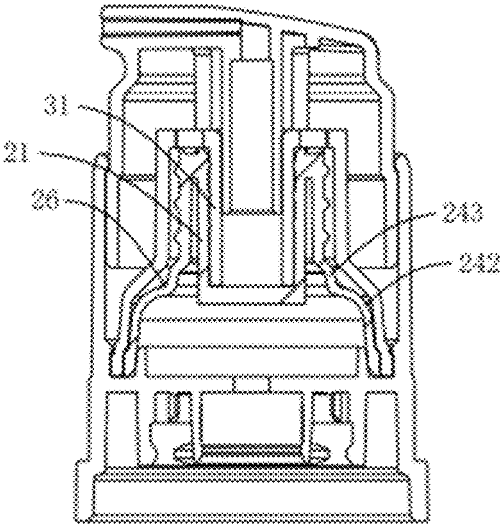
FIG. 7 is a schematic structural sectional view provided by a fourth embodiment of an all-plastic pump of the disclosure.
Figure 8:
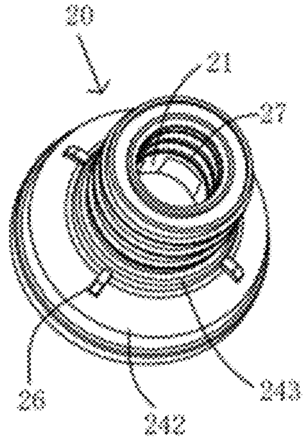
FIG. 8 is a schematic structural vertical view of a plastic spring in FIG. 7.
Figure 9:
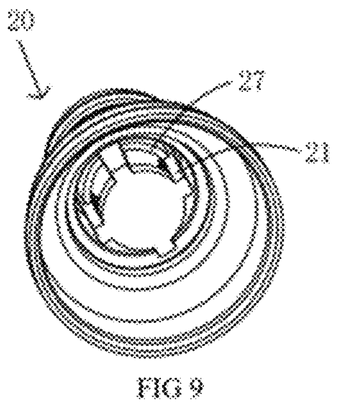
FIG. 9 is a schematic structural bottom view of a plastic spring in FIG. 7.

A fourth embodiment of an all-plastic pump is shown in FIGS. 7-9, which is basically the same as the third embodiment of the all-plastic pump. The difference is that a joint of the buffer tube section 243 and the wide tube section 242 is provided with a plurality of reinforcing ribs 26, and both the buffer tube section 243 and the wide tube section 242 are connected to the reinforcing ribs 26.

At the moment, the plurality of reinforcing ribs 26 are circumferentially arranged in a circle at intervals in a separated manner. An inner side face of the reinforcing rib 26 is connected and fixed to an outer side face of the buffer tube section 243. A bottom face of the reinforcing rib 26 is connected and fixed to an outer top of the wide tube section 242. Not only is the connection strength of the buffer tube section 243 and the wide tube section 242 enhanced, but also appearance stability of the buffer tube section 243 and the wide tube section 242 is maintained, so as to ensure that an enough temporary storage space can be provided for contents.

Moreover, at the moment, in order to improve compression stability of the plastic spring 20, as shown in FIGS. 7-9, a circle of guide wall 27 is disposed on the inner wall 28*b* of the port 28*a*, away from the conveying hole 12, of the plastic spring 20, and the guide wall 27 surrounds the stop tube 31 and is connected and fixed to the plurality of supporting rods 21.

The guide wall 27 extends inwards from the port of the plastic spring 20, so that a thickness of the port of the plastic spring 20 is increased, that is, the plastic spring 20 and the stop tube 31 are connected more tightly. Not only can sealing performance be improved, but also smoothness of relative movement of the plastic spring 20 and the stop tube 31 is better optimized.

Figure 10:
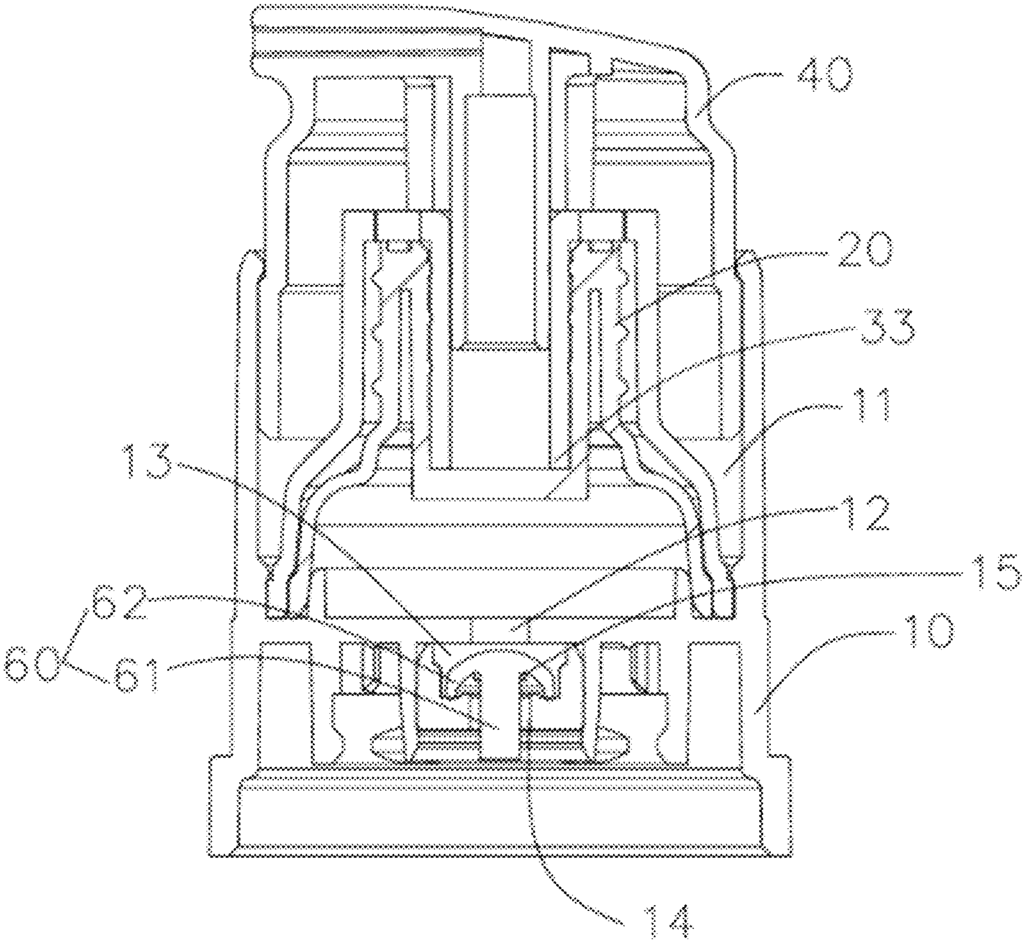
FIG. 10 is a schematic structural sectional view provided by a fifth embodiment of an all-plastic pump of the disclosure.
Figure 11:
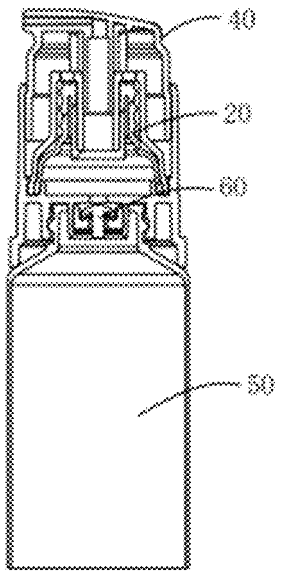
FIG. 11 is a schematic structural sectional view of assembly of FIG. 10 and a plastic bottle body.

A fifth embodiment of an all-plastic pump is shown in FIGS. 10-11, which is basically the same as the fourth embodiment of the all-plastic pump. The difference is that a check cavity 13 is disposed in a side, facing away from the accessory cavity 11, of the outer cover 10. A check valve 60 is disposed in the check cavity 13, and the check cavity 13 and the accessory cavity 11 are in communication through the conveying hole 12. The check valve 60 is configured to achieve one-way communication in the direction from the check cavity 13 to the accessory cavity 11.

That is, this embodiment adds a second defense line for the all-plastic pump. In application, the contents in the plastic bottle body 50 can flow through the check valve 60 and then enters the plastic spring 20. But contents in the plastic spring 20 cannot pass through the check valve 60. Therefore, one-way communication of the check valve 60 is realized.

Specifically, in this embodiment, a guide hole 14 is formed inside the check cavity 13, and the check valve 60 includes a guide column 61 and an arc-cover-shaped sealing cover 62 connected to each other. The guide column 61 is inserted into the guide hole 14, and a gap is reserved between the guide column 61 and a hole wall 15 of the guide hole 14. The sealing cover 62 blocks communication between the conveying hole 12 and the guide hole 14, and the sealing cover 62 can deform under the action of external force, so that the conveying hole 12 is in communication with the guide hole 14.

For example, when a user presses the pressing head 40, contents will flow to the check valve 60. But the contents cannot flow back into the plastic bottle body 50 by being blocked by the sealing cover 62. When the pressing head 40 is reset, negative pressure will be formed, so that the check valve 60 moves upwards, blockage of the check valve 60 to the plastic bottle body 50 is relieved, and the contents in the plastic bottle body 50 can be extracted into the plastic spring 20, thereby being conveyed.

The above mentioned are preferred implementations of the disclosure. It should be noted that several improvements and refinements may be made by those of ordinary skill in the art without departing from the principles of the disclosure, and these improvements and refinements are also to be considered within the scope of the disclosure.

We claim:

1. An all-plastic pump, comprising an outer cover, a plastic spring, an inner cover and a pressing head, wherein an accessory cavity is defined by the outer cover, and a conveying hole is formed inside the accessory cavity;

the plastic spring is disposed in the accessory cavity, the plastic spring is in a tubular shape, the plastic spring positioned above the conveying hole, a plurality of supporting rods are circumferentially disposed on an inner wall of a port, away from the conveying hole, of the plastic spring, and respective ends of each of the supporting rods are connected to a baffle, close to the conveying hole;

the inner cover is disposed in the accessory cavity, the inner cover surrounds the plastic spring, a stop tube is disposed inside the inner cover, the stop tube penetrates into a space defined by the plurality of supporting rods, and a port of the stop tube is in sealing abutting connection with the baffle; and the pressing head is installed in the accessory cavity in a pressable manner, a discharging hole is formed outside the pressing head, a pressing sheet and a conveying tube are disposed inside the pressing head, the pressing sheet surrounds the conveying tube, the pressing sheet is opposite to an end face of the plastic spring, the conveying tube is inserted into the stop tube, the conveying tube is in communication with the discharging hole, and pressing of the pressing head is configured to push the pressing sheet to urge the plastic spring so as to separate the baffle and the stop tube from each other.

2. The all-plastic pump according to claim 1, wherein a length of the plurality of supporting rods is smaller than a length of the plastic spring so that the baffle can move inside the plastic spring through compression of the plastic spring.

3. The all-plastic pump according to claim 1, wherein a portion, opposite to the pressing sheet, of the inner cover is provided with a hollow groove, a portion, opposite to the hollow groove, of an end face of the plastic spring is provided with a pressing groove, and the pressing sheet.

4. The all-plastic pump according to claim 1, wherein the plastic spring comprises a narrow tube section and a wide tube section connected to each other, the baffle and the plurality of supporting rods are disposed in the narrow tube section, and the wide tube section surrounds the conveying hole.

5. The all-plastic pump according to claim 4, wherein a plurality of circles of convex rings separately arranged are disposed on an outer surface of the narrow tube section, and circumferentially surrounds an outer wall of the narrow tube section.

6. The all-plastic pump according to claim 4, wherein the plastic spring further comprises a buffer tube section, a tube diameter of the buffer tube section is larger than a tube diameter of the narrow tube section, and is smaller than a tube diameter of the wide tube section.

7. The all-plastic pump according to claim 6, wherein a joint of the buffer tube section and the wide tube section is provided with a plurality of reinforcing ribs, and both the buffer tube section and the wide tube section are connected to the reinforcing ribs.

8. The all-plastic pump according to claim 1, wherein a circle of a guide wall is disposed on the inner wall of the port, away from the conveying hole, of the plastic spring, and the guide wall surrounds the stop tube and is connected and fixed to the plurality of supporting rods.

9. The all-plastic pump according to claim 1, wherein a check cavity is disposed in a side, facing away from the accessory cavity, of the outer cover, a check valve is disposed in the check cavity, the check cavity and the accessory cavity are in communication through the conveying hole, and the check valve is configured to achieve one-way communication in the direction from the check cavity to the accessory cavity.

10. The all-plastic pump according to claim 9, wherein a guide hole is formed inside the check cavity, the check valve comprises a guide column and an arc-cover-shaped sealing cover connected to each other, the guide column is inserted into the guide hole, a gap is reserved between the guide column and a hole wall of the guide hole, the sealing cover blocks communication between the conveying hole and the guide hole, and the sealing cover can deform under the action of external force, so that the conveying hole is in communication with the guide hole.

* * * * *